G. MONRATH.
CORROSION RESISTING CONDUIT SECTIONS AND FITTINGS.
APPLICATION FILED NOV. 7, 1916.
1,276,394.
Patented Aug. 20, 1918.
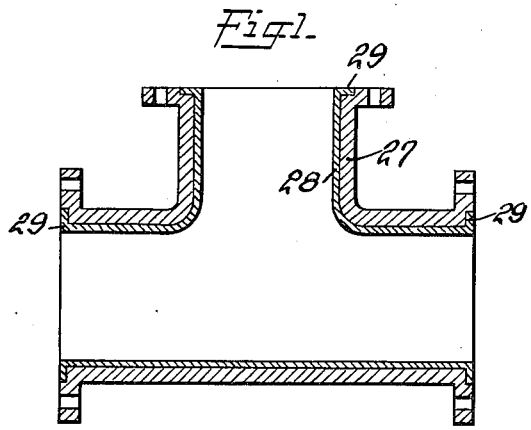
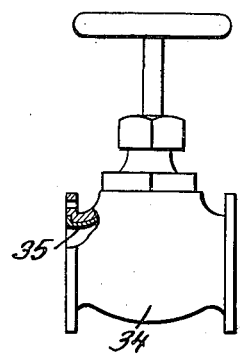
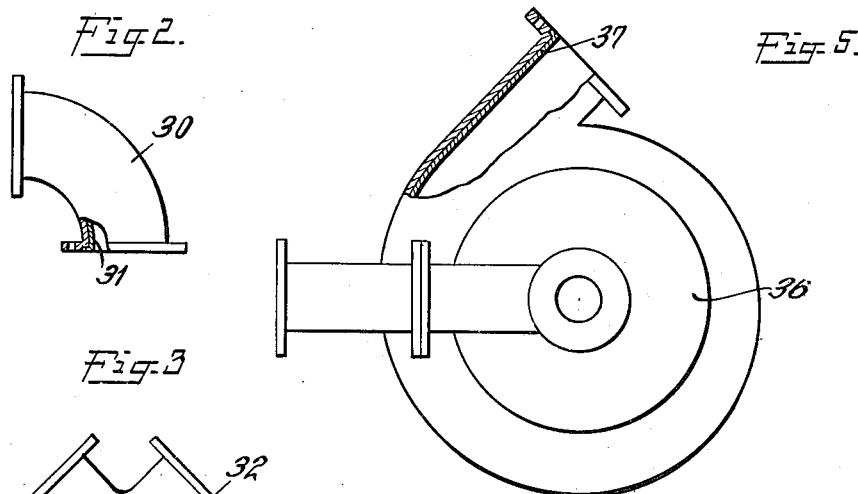
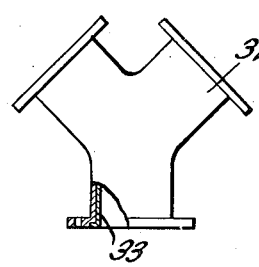
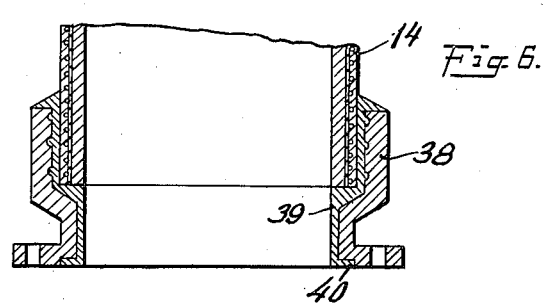
INVENTOR
Gustav Monrath
BY
Pennie Davis Marvin
ATTORNEYS

UNITED STATES PATENT OFFICE.

GUSTAV MONRATH, OF CHUQUICAMATA, CHILE, ASSIGNOR TO CHILE EXPLORATION COMPANY, OF NEW YORK, N. Y., A CORPORATION OF NEW JERSEY.

CORROSION-RESISTING CONDUIT SECTIONS AND FITTINGS.

1,276,394.  Specification of Letters Patent.  Patented Aug. 20, 1918.

Application filed November 7, 1916. Serial No. 129,958.

*To all whom it may concern:*

Be it known that I, GUSTAV MONRATH, a citizen of the United States, residing at Chuquicamata, Republic of Chile, South America, have invented certain new and useful Improvements in Corrosion - Resisting Conduit Sections and Fittings; and I do hereby declare the following to be a full, clear, and exact description of the invention, such as will enable others skilled in the art to which it appertains to make and use the same.

This invention relates to corrosion-resisting and acid-resisting pipe or conduit sections or fittings of cast iron or other metal provided with a lining of a hard asphaltum mastic composition.

The invention relates more particularly to fittings and couplings and attachments for use with corrosion-resisting conduits which are themselves of a corrosion-resisting construction, such as conduits made of asphaltum mastic compositions with metal reinforcing elements embedded.

The invention is illustrated in the accompanying drawings, in which:

Figure 1 shows a T coupling of cast iron provided with a corrosion-resisting or acid-resisting lining of the asphaltum composition, the coupling being shown in central section.

Figs. 2 and 3 show respectively an elbow and a Y connection or coupling of metal provided with a lining similar to that of Fig. 1;

Fig. 4 shows a valve casing provided with a similar lining;

Fig. 5 shows a pump casing and conduit provided with a similar lining; and

Fig. 6 shows a modified form of coupling or union as applied to the end of a reinforced mastic composition pipe section.

The material which has been found of particular value for use in the production of the corrosion-resisting lining is a composition of asphalt which will give the greatest possible set with the least amount of contraction. As a filler, a coarse rock sand with sufficient rough dust to fill the voids is well adapted for use. The amount of asphalt to sand should be so proportioned as to completely coat or lubricate every particle of sand and dust. A surplus of asphalt may, however, be used, since the necessary strength for resisting internal pressure is supplied by the cast iron to which the asphalt lining is applied.

Figs. 1, 2 and 3, show respectively T, elbow and Y couplings of cast iron or other appropriate metal provided with a lining of the asphalt composition. These couplings are flanged so that they can be secured to similar flanged couplings. The lining is so arranged that the sections or fittings will be corrosion-resisting and acid-proof throughout.

Referring to Fig. 1 it will be noted that the iron flanged T coupling 27 has a lining 28 of the mastic composition which extends into recesses 29 at the flanged end of the coupling to which a similar coupling is attached. The couplings are thus protected where they come together so that there is a continuous lining of the mastic composition throughout. The couplings may further be connected by painting or coating the abutting ends, or by softening the composition where it comes together so that the continuity of the lining may not be broken and permit escape of liquid where the couplings are joined together.

The elbow 30 of Fig. 2 is provided with a lining 31 similar to that of Fig. 1, and the Y fitting 32 of Fig. 3 is provided with a similar lining 33. Fig. 4 shows a valve casing 34 which is also lined with a mastic lining 35; Fig. 5 shows conventionally a centrifugal pump 36 the casing of which is similarly provided with a lining 37.

Fig. 6 shows a flanged iron coupling 38 connected to a pipe section 14 made of asphaltum mastic composition provided with a metal reinforcing cylinder or insert. This reinforcing insert may be made of expanded metal wound with wire.

The pipe section 14 is united to the flanged iron coupling 38 by the composition 39 which is cast between the pipe section and fitting and which extends within the iron fitting to form a lining therefor similar to the linings of the fittings of Figs. 1 to 5. This lining similarly extends into a recess 40 so that similar fittings may be connected in the manner above described.

Fittings such as that of Fig. 6 can be united directly to similar fittings and pipe sections thus joined to each other through the intermediary of such cast iron couplings which are fastened to each other and which have a lining of a nature adapted to make the conduit as a whole corrosion-resisting. So also, fittings or couplings such as that of Fig. 6 may be united to fittings such as shown in Figs. 1 to 5. That is to say, the fittings of Figs. 1 to 5 are adapted for use between pipe sections 14 which are provided with fittings of the construction shown in Fig. 6. Provision is thus made for uniting composition pipe sections to each other or to T, Y, elbow, valve or other fittings which may be required in the handling of acids and other liquids.

In producing the linings in cast iron couplings or fittings, and in uniting pipe sections to such fittings, as in Fig. 6, the cast iron is thoroughly cleaned on the inside. A core of sheet iron or other appropriate material, clamped together with set screws or otherwise secured together, is suitably placed and spaced within the iron fittings. In the case of large fittings the sheet iron core may be made to retain its shape by disks of wood at the top, bottom, and center. The core may be held in place within the fitting by iron spacers or by other suitable means, and the casting of the lining may, with advantage, be effected by placing the fitting and core on an iron plate.

The fitting is then heated to a temperature nearly that of molten asphalt, and the mastic composition is then poured in little by little and equally distributed around the core. Where spacers are used at the beginning of the casting operation to hold the core in proper position, they may be gradually withdrawn as the mastic settles. After the lining has been completed, the mastic may be cooled, as by filling the core with water, and the core then withdrawn. The face of the flanges is smoothed over with a lamp or trowel. Reinforcement for the mastic lining is not necessary inasmuch as the iron fittings themselves furnish the necessary strength and, if the iron is properly cleaned and heated, the mastic will stick solidly to it. The union between the mastic and the iron seems to be promoted by the larger coefficient of expansion of the iron which tends to make it shrink upon the cast mastic, clamping it firmly.

In casting linings for pump casings and similar castings requiring exact dimensions and a very hard composition for the lining, it is necessary to use a core of wood or iron so constructed as to allow trapped air to escape freely. Burs appearing on the castings, owing to such vents, can be afterward smoothed off with the trowel and templet.

What I claim is:

1. Corrosion-resisting conduit sections, couplings, and fittings, of cast iron or similar metal provided with a lining of hard asphaltum mastic composition cast therein, and adapted for use with corrosion-resisting conduit sections to form a conduit corrosion-resisting throughout; substantially as described.

2. Flanged corrosion-resisting conduit sections, couplings, and fittings, of cast iron or similar metal provided with a lining of hard asphaltum mastic composition cast therein, and adapted for use with corrosion-resisting conduit sections to form a conduit corrosion-resisting throughout, the flanged portions of such sections, couplings, and fittings, being provided with a recess filled with the composition and adapted to abut against the composition in similar recesses of other sections, etc., substantially as described.

3. Corrosion-resisting couplings or fittings for conduits of asphaltum mastic composition comprising cast iron sections provided with a cast lining of hard asphaltum mastic composition uniting the same with the end of such conduit section and forming a lining for the metal, whereby similar sections and fittings can be united therewith to form conduits corrosion-resisting throughout, substantially as described.

In testimony whereof I affix my signature.

GUSTAV MONRATH.